Oct. 12, 1954
J. P. KANE
2,691,165
VISOR ATTACHMENT FOR EYEGLASSES
Filed Jan. 30, 1953
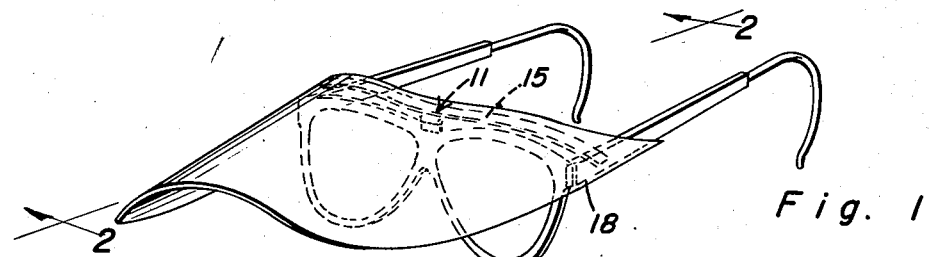
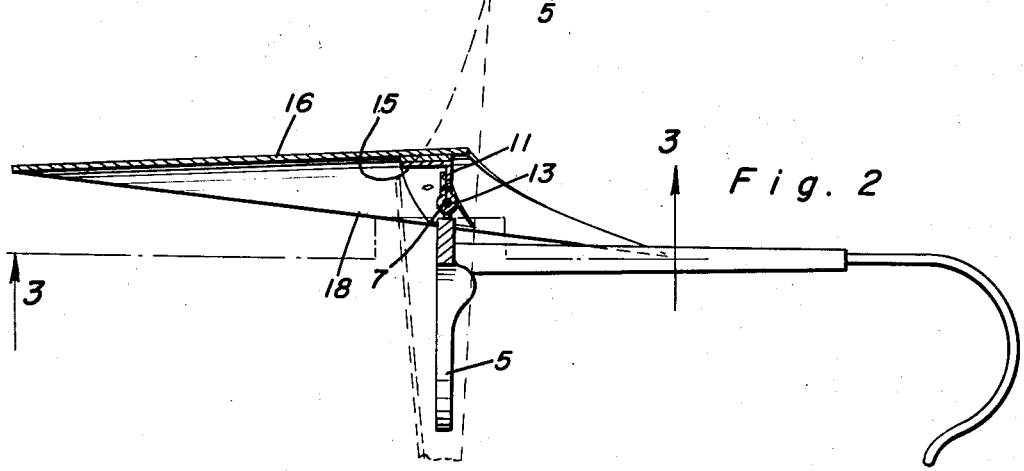
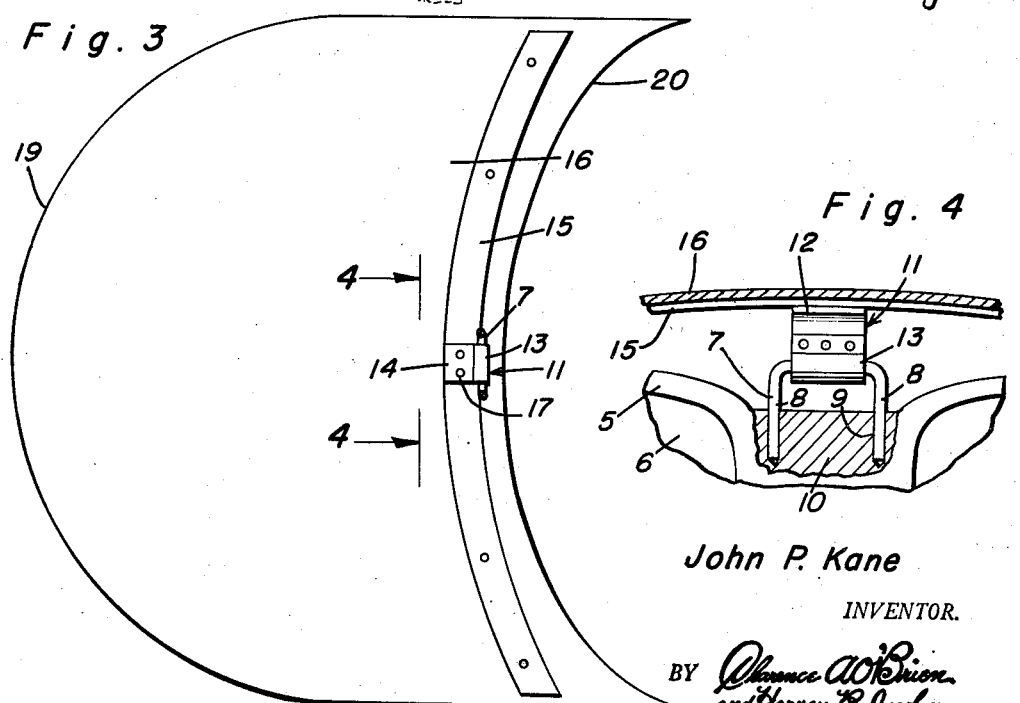
John P. Kane
INVENTOR.

Patented Oct. 12, 1954

2,691,165

UNITED STATES PATENT OFFICE 2,691,165

VISOR ATTACHMENT FOR EYEGLASSES

John P. Kane, Valley Falls, R. I.

Application January 30, 1953, Serial No. 334,177

1 Claim. (Cl. 2—13)

The present invention relates to new and useful improvements in visors for eyeglasses and more particularly to a novel attaching construction for pivotally connecting a visor or sun shield to a sun glass or other type of eyeglass frame.

An important object of the invention is to provide a staple having its leg portions embedded in the top of the bridge portion of the eyeglass frame and an L-shaped bracket formed at one end with a bearing sleeve frictionally pivoted to the staple and to which the visor is secured for securing the visor in vertically adjusted position in front of the eyeglasses.

Another object is to provide a device of this character of simple and practical construction, which is neat and attractive in appearance, relatively inexpensive to manufacture and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view;

Figure 2 is a longitudinal sectional view taken on a line 2—2 of Figure 1;

Figure 3 is a horizontal view taken on a line 3—3 of Figure 2 and showing the visor in bottom plan view; and, Figure 4 is an enlarged fragmentary sectional view taken on a line 4—4 of Figure 3.

Referring now to the drawing in detail, wherein for the purpose of illustration I have disclosed a preferred embodiment of my invention, the numeral 5 designates a pair of eyeglass frames which may be equipped with translucent sun glass lenses 6 or other conventional types of lenses.

A staple 7 has its leg portions 8 fitted in holes 9 drilled in the top of the bridge portion 10 of the frame and an inverted L-shaped bracket 11 is formed at the lower end of its vertical portion 12 with a bearing sleeve 13 which is frictionally mounted on the staple. The horizontal portion 14 of the bracket is secured on top of a reinforcing bow 15 of rigid, ribbon-like material and which in turn is secured to the underside of a visor 16 by rivets 17 or other suitable fastening means.

The visor 16 is of opaque material and is curved downwardly at its side edges 18 which protrude outwardly beyond the sides of the frame 5 and the front edge 19 of the visor is convexed, while the rear edge 20 thereof is concaved to conform to the forehead of a person.

The frictional fit of sleeve 13 with staple 7 holds the visor in a horizontal position, when the eyeglasses are being worn, and also holds the visor in a vertically adjusted or downwardly sloping position in front of the eyeglasses when conditions warrant, or the visor may swing downwardly at a ninety degree angle in front of the eyeglasses for carrying in a compactly folded position.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

In a pair of eyeglasses having a bridge portion, a visor, a staple upstanding from and having legs secured in the bridge portion, and a connector between the staple and the visor comprising an inverted L-shaped bracket including a portion secured to the visor and having a bearing sleeve frictionally pivoted on the staple.

References Cited in the file of this patent

UNITED STATES PATENTS

| Number | Name | Date |
|---|---|---|
| 1,772,825 | Costenbader | Aug. 12, 1930 |
| 1,890,865 | Scherz | Dec. 13, 1932 |